United States Patent [19]

Ellwood

[11] 3,947,201

[45] Mar. 30, 1976

[54] EXTRUDER AND ROLL DIE APPARATUS
[75] Inventor: Henry Ellwood, Rochdale, England
[73] Assignee: USM Corporation, Boston, Mass.
[22] Filed: Nov. 18, 1974
[21] Appl. No.: 524,792

[30] Foreign Application Priority Data
Dec. 7, 1973  United Kingdom............... 56814/73

[52] U.S. Cl. ............... 425/147; 425/327; 425/381; 425/466; 425/376
[51] Int. Cl.² ......................................... B29C 3/06
[58] Field of Search ...... 264/40; 425/147, 327, 466, 425/380, 381, 145, 140, 141, 149, 366, 367, 394, 185, 188, 192

[56] References Cited
UNITED STATES PATENTS

| | | |
|---|---|---|
| 3,274,645 | 9/1966 | Chase ............................ 425/367 X |
| 3,359,597 | 12/1967 | Bainton........................... 425/367 X |
| 3,482,279 | 12/1969 | Anders et al. ...................... 425/192 |
| 3,535,738 | 10/1970 | Vossen.............................. 425/192 |
| 3,540,094 | 11/1970 | Janssen........................... 425/381 X |
| 3,543,333 | 12/1970 | Anders et al. .................. 425/327 X |
| 3,694,120 | 9/1972 | Walton ........................... 425/381 X |

*Primary Examiner*—R. Spencer Annear
*Assistant Examiner*—Mark Rosenbaum
*Attorney, Agent, or Firm*—Vincent A. White; Richard B. Megley

[57] ABSTRACT

Plastic extruding and roll forming apparatus having a connecting passage at least partially formed by a plate which is swingable between open and closed position to conduct material from an extruder to forming rolls and to provide access and/or to release excess material in the passage. The extrusion and forming rates are controlled by the movement of the plate.

8 Claims, 3 Drawing Figures

EXTRUDER AND ROLL DIE APPARATUS

BACKGROUND OF THE INVENTION

This invention is concerned with improvements in or relating to extruders, and is especially concerned with extruders of the type including rolls by which material is formed into sheets. Extruders are known in which material to be processed, for example rubber or plastics material, is extruded from a screw-type extruder portion into the nip between two rotating rolls which form the material into a sheet of desired thickness or form. In known extruders an extrusion head is interposed between the end of an extruder screw and the rolls, the extruder head being so shaped that the material issues from a slot parallel with and into the nip between the rolls.

A serious problem encountered with such extruders is to ensure that the material formed by the rolls is withdrawn at the same rate as the material is supplied to the rolls by the extruder. If the material is extruded faster than it is withdrawn, great pressures quickly build-up placing excessive loads on the extruder, the rolls and any connecting members. If the material is withdrawn faster than it is extruded, a non-uniform sheet will be formed. For this reason it has been necessary to construct the various units to withstand high stresses. Certain prior art devices provide means for sensing pressure build-up in the closed passageway and for controlling the extrusion or withdrawing rates. Other devices have provided means for detecting strain or separation of the extruder and roll mounting even though heavily constructed. Such massive construction has made it difficult to separate the units to permit access for cleaning and the like.

OBJECTS OF THE INVENTION

Accordingly, it is a general object of the invention to provide an improved extruding apparatus which overcomes the above problems by relatively simple and light constructions.

The invention provides, as one of its several features, a roller die extruder comprising an extruder portion, rolls and a member such as a swingable plate disposed between an outlet end of the extruder portion and the rolls to bound, in part, a passage through which material from the extruder passes into the nip between the rolls. The member is yieldingly mounted in such a manner that if, in the operation of the extruder, the material in the region between the outlet end of the extruder portion and the rolls exceeds a preselected volume, the member yields whereby to release the excess material in the region. The invention also provides, as another of its features that said member is movable to permit access to the outlet end of the extruder. Movement of the member also may be used to sense a build-up or reduction of material in the passage and to cause synchronization of the extrusion and roll withdrawal rates.

The invention further provides, as yet another of its several features, an extruder comprising a cylindrical bore, an extruder screw rotatably mounted in the bore and an outlet member at an outlet end of the bore. The outlet member has an opening therein which has a first dimension slightly greater than the diameter of a nose portion of the screw, and which has a second dimension at right angles to said first dimension equal to or greater than the diameter of the nose portion. The construction and arrangement is such that the nose portion of the screw is disposed in the opening with its axis of rotation passing near or through the center of the opening, whereby to divide the opening into two parts so that in the operation of the extruder, material forced through the opening by rotation of the screw will issue from the aperture in two streams.

The above and other of the various objects and several features of the present invention will become more clear from the following description, to be read with reference to the accompanying drawings, of the illustrative extruder aforementioned. It will be realized that this illustrative extruder had been selected for description to illustrate the invention by way of example and not of limitation of the invention.

BRIEF DESCRIPTION OF THE DRAWINGS

In the accompanying drawings:

Referring to the drawings, the apparatus comprises an extruder 10, a connecting unit 12 secured to an outlet end of the extruder 10, and opposed die rolls 14. The extruder typically comprises a tubular barrel 16 having an extruder bore 18 within which an extruder screw 20 is mounted for rotation. The connecting unit 12 comprises a shear plate 22 secured to the barrel 16 and having a rectangular opening 24 when viewed from the front with a height dimension, as seen in FIG. 2, slightly less than the diameter of the extruder bore 18. As seen in FIG. 3, the opening 24 diverges from the extruder bore 18. A nose 26 of the extruder screw projects into the opening and screw flights 28 of the extruder screw terminate in sliding contact with a rear face 30 of the shear plate 22. The height of the opening 24 is such that the nose 26 of the screw rotates in the opening with only a slight clearance between top and bottom of the opening and the nose 26.

Figure 1:
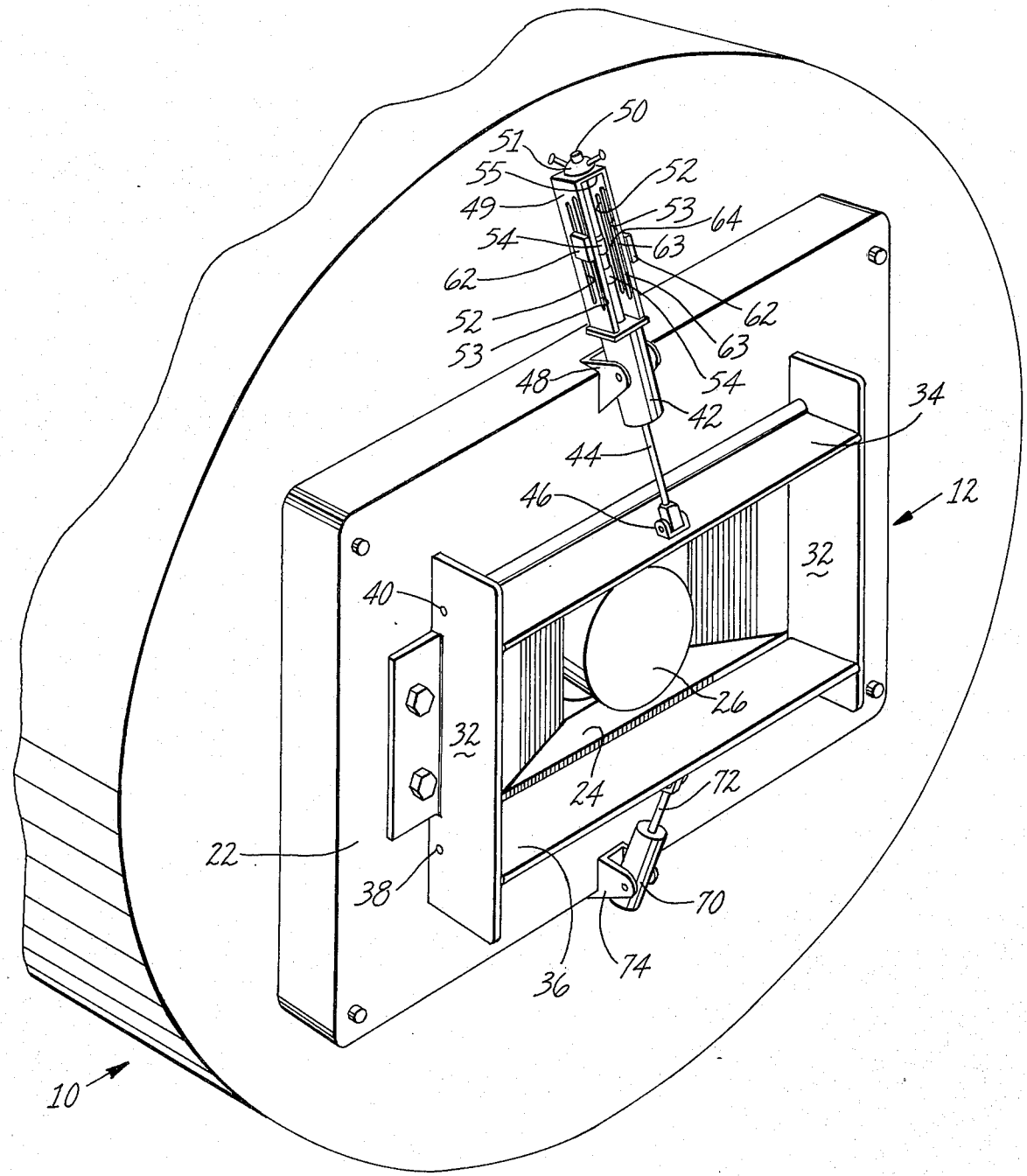
FIG. 1 is a perspective view of apparatus embodying the invention and showing one end of an extruder and a connecting unit secured to the extruder.
Figure 2:
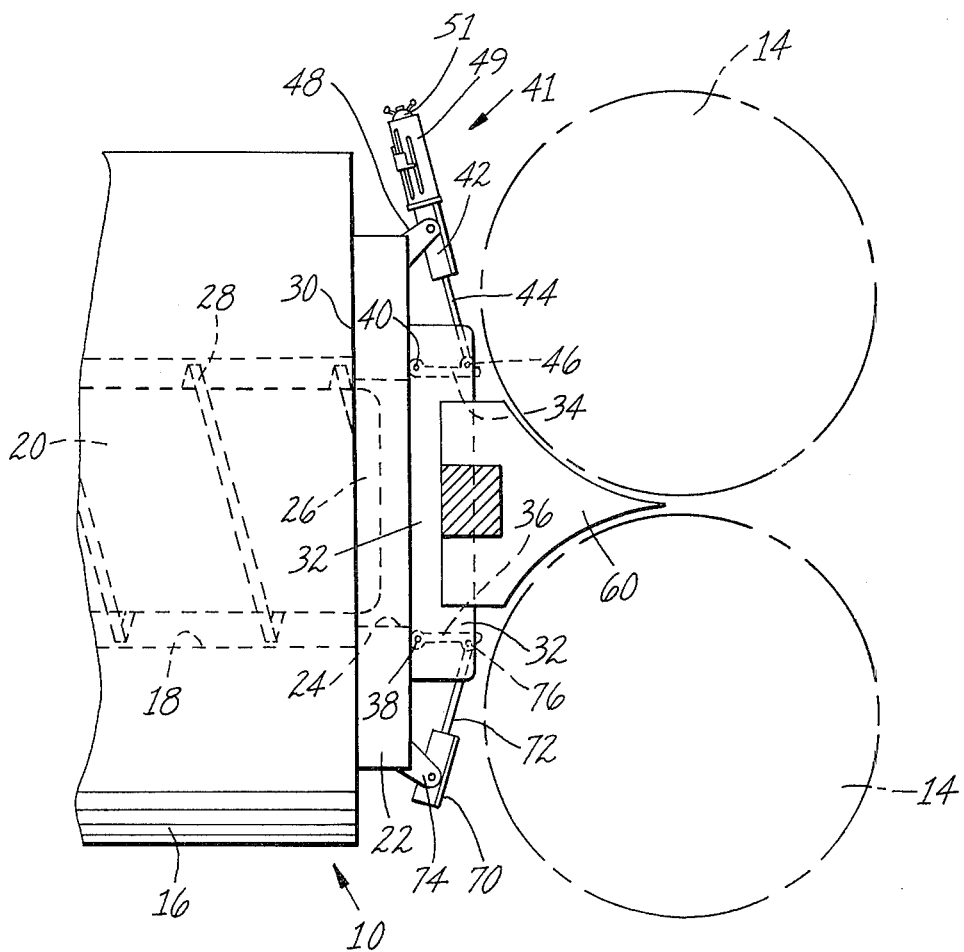
FIG. 2 is a side view of the illustrative apparatus showing the extruder, the connecting unit and a pair of die rolls.

The connecting unit 12 includes side guides 32 secured to a front face of the shear plate 22 at either side of the front end of the opening 24. The connecting unit 12 also includes top and bottom guide plates 34, 36 respectively. The bottom guide plate 36 is pivoted on an axle 38 extending between the side guides 32 beneath the opening 24. The plate 36 is normally held in a generally horizontal position by air under pressure in a cylinder 70, an upper surface of the plate being disposed slightly below the bottom edge of the opening 24 and a front edge of the plate terminating just short of a lower one of the rolls 14. The cylinder 70 is pivoted on a bracket 74 secured to the shear plate, and a piston rod 72 extending from the cylinder is connected by a pivot pin 76 to a front edge portion of the guide plate 36.

Figure 3:
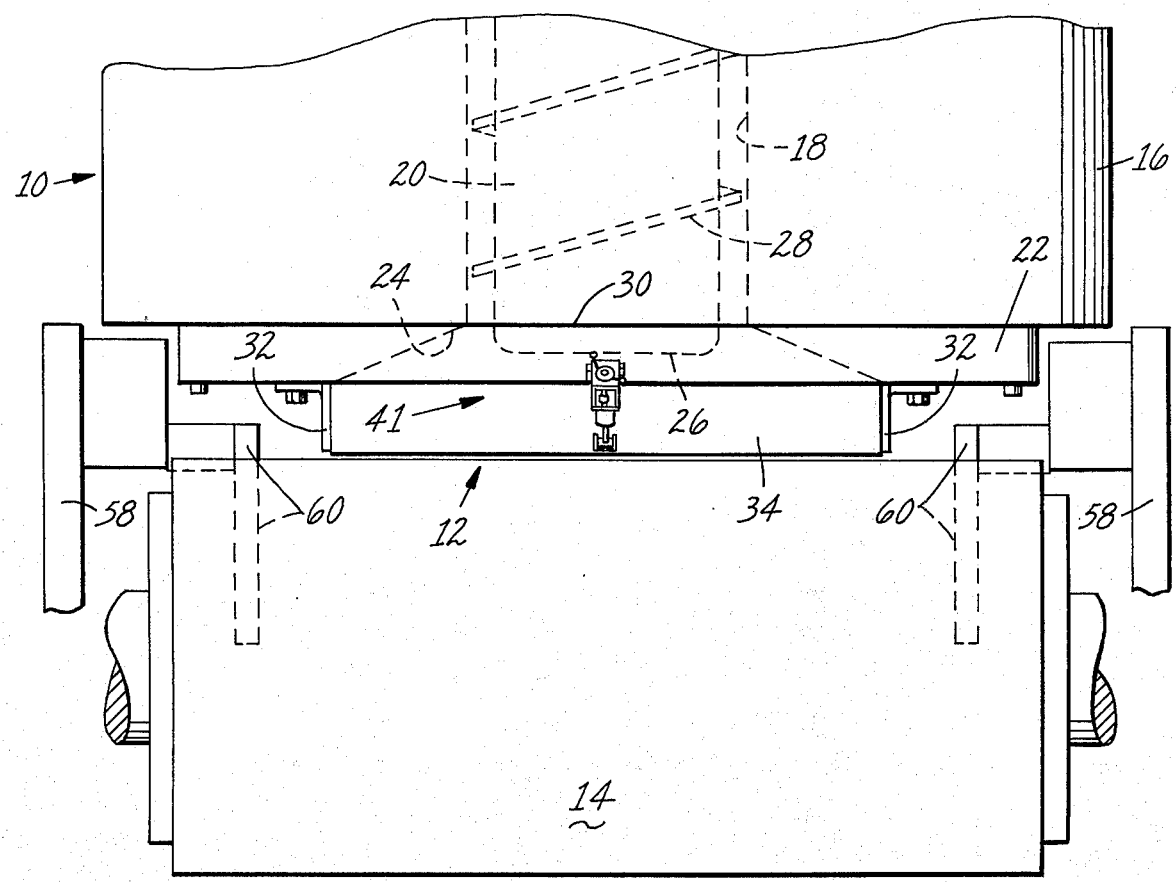
FIG. 3 is a plan view of the apparatus shown in FIG. 2.

The top guide plate 34 is pivoted on an axle 40 extending between the side guides 32 above the opening 24 in the shear plate 22. The top guide plate is normally held by a piston and cylinder arrangement 41 in a generally horizontal position just above the top edge of the opening 24 and with the front end close to the upper roll 14. The piston and cylinder arrangement 41 is pivoted on a bracket 48 secured to the shear plate 22. A piston rod 44 projecting down from the cylinder is connected to the top guide plate 34 by a pivot pin 46. Upstanding frame members 49 are secured to the upper end of the cylinder and are connected at their upper ends by a bridge piece 55. The piston rod 44 extends through the upper end of the cylinder and has an extension 50 which extends between the frame members 49 and projects through the bridge piece 55. An adjuster wing nut 51 is threaded onto the extension 50 above the bridge piece 55. Thus admission of air under pressure to the upper end of the cylinder drives the piston rod 44 down to the extent permitted by engagement of a piston on the rod with the bottom of the cylinder 42, whereby to determine the lowermost generally horizontal position of the top guide plate 34. The frame members 49 are provided with front slots 53 and rear slots 52 parallel with the piston rod 44. Two microswitches 62 are mounted, one on each of the frame members 49 by clamping screws 63 passing through the slots 53. The positions of the switches heightwise of the frame members are adjustable along the slots 53. Operating plungers 64 of the switches project through the slots 52 towards the extension 50 of the piston rod 44. Two cams 54 are secured to the extension 50 between the bridge piece 55 and the upper end portion of the cylinder 42 and are disposed so as to actuate the plungers 64 of the microswitches 62 to control the extruder. In the operation of the illustrative extruder the piston and cylinder 41 acts to maintain the top guide plate 34 in the horizontal position determined by engagement of the piston with the bottom of the cylinder 42. The force with which the top guide place is held can be adjusted by varying the pressure of air supplied to the cylinder 42. The rolls 14 are mounted for rotation in bearings (not shown) carried in frame members 58 (FIG. 3). Drive means (not shown) is provided to drive the rolls 14. Side guide members 60 are secured to the frame members 58 so as to closely fit the periphery of the rolls 14, the distance between the members 60 being adjustable. The construction is such that the side guides 32 extend forwardly between the guide members 60, and the top and bottom guide plates 34, 36 extend forwardly respectively above and below the guide members 60.

In the operation of the illustrative extruder material to be formed into a sheet, for example rubber, is supplied to a feed end of the extruder portion 10. The extruder screw 20 is rotatably driven by a motor (not shown), and mixes and forces the material along the extruder bore 18 through the opening 24 in the shear plate 22. The configuration of the opening 24 is such that the material forced through the opening is sheared by the end of the screw flights 28 working against the rear face 30 of the shear plate 22 to force the material through the opening in two streams, one at either side of the screw 20. The usual "corkscrew" effect of the screw on the material forced through the opening 24 is thus eliminated and the material is allowed to travel forward steadily. Passageways (not shown) may be formed in the shear plate 22 (and if desired in the guide plates 34, 36) so that cooling or heating fluid can be passed, as necessary, through the passageways to control the temperature of the shear plate and guide plates. Rotation of the screw 20 is started with the rolls 14 stationary and with the guide plates held in horizontal positions by air pressure in the cylinders 42, 70. Material leaving the extruder bore 18 is forced into a connecting passage formed by the opening 24 and between the side guides 32, guide plates 34, 36 and guide members 60 in the connecting portion 12. When this connecting passage is full of material extruded by the extruder portion 10, the volume of the material building up in the connecting passage acts on the top guide plate 34 to swing it upwardly about the axle 40, against the action of the air pressure in the cylinder 42. The air pressure was previously adjusted to maintain a suitable yieldable force on the plate 34 and thus a suitable maximum force on the material in the connecting passage. When the top guide plate 34 has been lifted by a suitable extent one of the cams 54 actuate one of the microswitches to cause starting of the motor (not shown) of the rolls 14. Preferably, the circuitry is arranged so that the motor of the rolls 14 is slowly accelerated.

As the rolls 14 start to rotate, material is drawn from the connecting passage through the nip between the rolls in the form of a sheet. The side guide members 60 ensure that the sheet so formed has a clean edge and controls the width of the sheet formed. As the rolls slowly accelerate, the material is moved more rapidly from the connecting passage and the volume of material in the connecting passage gradually falls so that the top guide plate 34 returns, toward its horizontal position, under the force of the air pressure in the cylinder 42. When the plate 34 has reached an intermediate position said one cam 54 is disengaged from the plunger 64 of the said one of the microswitches 62 and the circuitry preferably is such that the speed of the motor of the rolls 14 then remains constant. The volume of material in the passage may continue to fall if the rolls draw it off faster than it is extruded into the passage and the top guide plate then continues to drop until the other one of the cams 54 actuates the other one of the microswitches 62. This causes the speed of the rolls 14 to be gradually reduced so that the material again builds up in the connecting passage until the top guide plate 34 is again lifted to the intermediate position. Said other of the cams 54 thus again disengages from said other one of the microswitches and the speed of the motor of the rolls again remains constant until the volume again builds up sufficiently to again actuate the first one of the microswitches thus to again speed up the rolls 14. This cycle continues until the with drawings speed of the rolls 14 is synchronised with the rate of delivery of the material by the screw 20. The force exerted on the bottom guide plate 36 by the cylinder 70 is selected to be such that the plate 36 is maintained in its horizontal position during normal operation of the illustrative extruder.

The illustrative extruder may be so constructed and arranged that the electrical circuitry (not shown but of common type) associated with the microswitches 62 can be conditioned alternatively to control the speed of rotation of the extruder screw 20, the speed of the rolls 14 being in this mode of operation, maintained constant. In this mode of operation the rolls 14 are initially set rotating at a suitable constant speed and the screw 20 is set in operation, the speed of rotation of the screw gradually increasing until movement of the top guide plate 34 under pressure of material in the connecting passage operates the microswitch 62 to cause the speed of the screw to gradually reduce. The speed of the screw 20 and rolls 14 gradually synchronise in a similar manner to that described previously where the microswitch 62 controls the speed of the rolls.

Should the rolls 14 be stopped during normal operation such, for example by failure of the motor, or should the rolls operating at maximum speed be unable to remove material at the rate of delivery by the extruder portion 10, first the top guide plate 34 and then the bottom guide plate 36 will be pushed wide open by build-up of the material in the connecting passage. The excess material then can escape through the openings so formed without excessive pressures being generated between the extruder and the rolls. The frame members 58 carrying the rolls 14 also may be mounted on vibration insulators (not shown) which allow the rolls 14 carried by the frame 58 to sway away from the extruder should the pressure between the extruder portion and the rolls build up to an unacceptable level. A limit switch may be arranged, as a further safeguard, to be operated by the swaying of the frame members to stop the extruder screw 20. Thus the arrangement of the illustrative extruder militates against excessive pressures building up between the extruder and the rolls, damage to the illustrative extruder thereby being avoided should any breakdown occur.

Should it be necessary to have access to the connecting passage for example to clean out the passage and the nose 26 of the screw 20, or to clear away small tailings at the end of a run, the top and bottom die plates 34, 36 can be swung about their axles 40, 38 so that the plates are in a vertical position. The length of the plates is such that as they are swung about the axles 40, 38 they just clear the surface of the rolls 14. The bottom guide plate 36 may be moved by allowing the air under pressure to escape from beneath the piston in the cylinder 70 which normally holds the plate 36 in the horizontal position, thus lowering the plate 36 to the vertical position. The top guide plate 34 is moved by admitting air under pressure beneath the piston in the cylinder 42 while allowing air to escape from above this piston and the plate 34 is thus lifted until it is in the vertical position. The wing nut 50 also may be threaded by the operator down the extension 51 of the rod 44 to retain the plate 34 in the vertical position. The illustrative apparatus is simple in construction and is arranged to operate in such a way that only minimum pressures are generated in the connecting passage between the extruder and the rolls. The nose 26 of the screw 20, and the connecting passage are readily accessible for cleaning purposes and eliminate the usual necessity for known extruders to provide means, for example hydraulic pistons and cylinders, for separating the extruder from the rolls to permit access. Because only small pressures are generated between the extruder and the rolls, it is possible for the rolls to be mounted on vibration insulators and not secured to a fixed base and should it be necessary to remove the screw 20 from the extruder portion the rolls can readily be moved aside. The construction and arrangement of the extruder and the connecting portion is such that rolls of smaller diameter may be used than would otherwise be necessary to ensure that the rolls bite into the material in the connecting passage.

In a modified version (not shown) of the illustrative machine the top guide plate may be maintained in its horizontal position by a spring strut arrangement, in place of the piston and cylinder arrangement, and the bottom guide plate 36 may be maintained in its horizontal position by removable screws without departing from the scope of the invention. Should it be necessary to obtain access to the connecting passage, the plates 34, 36 can be moved to their vertical positions by an operator after first removing the spring pressure from the top plate and removing the screws from the bottom plate and the plates can then be bolted by the operator in their vertical positions. In this modified version a microswitch likewise may be arranged to be operated by movement of the plate 34 from the horizontal position (when the modified version is in operation) to control the speed of rotation of the rolls and/or the screw.

Having thus described my invention it should be apparent that various mechanisms and combinations of parts may be varied without departing from the scope of the invention as defined by the following claims.

I claim:

1. In apparatus for extruding and forming plastic material, an extruder for feeding plastic material, rolls adapted to receive and form the extruded material, a unit forming a connecting passage between the extruder and the rolls, said passage being formed at opposed sides of the extruder opening by stationary guides and at other opposed sides by plates extending between and swingably mounted on the guides for movement between open and closed positions, means for maintaining the plates in closed positions to direct extruded material into said rolls, the maintaining means being operable to move the plates to open positions to provide access to the rolls and the extruder.

2. Apparatus according to claim 1 in which the plate maintaining means are yieldable to permit the plates to be swung toward open positions by a build-up of material in the passage to permit escape of excess material.

3. Apparatus according to claim 2 in which said yieldable means comprise fluid pressure operated piston/cylinder devices and the pressure of the fluid is variable to provide variably yieldable forces holding the swingable plates in closed positions.

4. Apparatus according to claim 2 in which means are provided to sense build-up of excess material in the passage by detecting movement of the plates toward open position for controlling the withdrawing rate of the rolls.

5. Apparatus according to claim 2 in which means are provided to sense build-up and reduction of material in the passage by detecting movement of the plates toward and away from open position for synchronizing the extrusion rate and the withdrawing rate of the rolls.

6. Apparatus according to claim 5 in which the sensing means comprises limit switches actuated by opening movement of at least one of the plates to cause starting of the rolls when the passage is full of material.

7. Apparatus according to claim 6 in which detection of further opening of the plate by the limit switches causes the withdrawing speed of the rolls to be varied.

8. In apparatus for extruding plastic material comprising a barrel having a bore connecting a feed inlet and an outlet, a rotatable screw in the bore for plasticating and feeding material through the outlet, a shear plate at said outlet against which threads on the screw terminate and having an opening which receives a cylindrical end portion of the screw, said opening closely fitting the end portion at diametrically opposite sides and providing openings at other diametrically opposite sides whereby material is extruded in two separate streams.

* * * * *